US010844614B2

(12) United States Patent
Faotto

(10) Patent No.: US 10,844,614 B2
(45) Date of Patent: Nov. 24, 2020

(54) MULTILAYER INSULATING PANEL FOR THE INSTALLATION OF AN ELECTRIC HEATING SYSTEM IN SUBFLOORS OR WALLS

(71) Applicant: ELEMENTS S.r.l., Treviso (IT)

(72) Inventor: Ugo Faotto, Treviso (IT)

(73) Assignee: ELEMENTS S.r.l., Treviso (IT)

( * ) Notice: Subject to any disclaimer, the term of this patent is extended or adjusted under 35 U.S.C. 154(b) by 0 days.

(21) Appl. No.: 15/749,385

(22) PCT Filed: Jul. 27, 2016

(86) PCT No.: PCT/IB2016/054480
§ 371 (c)(1),
(2) Date: Jan. 31, 2018

(87) PCT Pub. No.: WO2017/021821
PCT Pub. Date: Feb. 9, 2017

(65) Prior Publication Data
US 2018/0223543 A1   Aug. 9, 2018

(30) Foreign Application Priority Data

Aug. 3, 2015   (IT) .................. 102015000041246

(51) Int. Cl.
*E04F 15/18*   (2006.01)
*F24D 13/02*   (2006.01)
(Continued)

(52) U.S. Cl.
CPC .............. *E04F 15/185* (2013.01); *B32B 3/06* (2013.01); *B32B 3/30* (2013.01); *B32B 5/022* (2013.01);
(Continued)

(58) Field of Classification Search
CPC ....... E04F 15/182; E04F 15/185; E04F 15/18; E04F 2290/023; E04B 5/48; F24D 13/024
See application file for complete search history.

(56) References Cited

U.S. PATENT DOCUMENTS

| 5,052,161 | A | * | 10/1991 | Whitacre | ............... | E04F 15/18 |
| | | | | | | 52/385 |
| 7,487,624 | B2 | * | 2/2009 | Baba | ..................... | E04B 1/7069 |
| | | | | | | 156/71 |
| 8,950,141 | B2 | * | 2/2015 | Schluter | ............... | E04F 15/182 |
| | | | | | | 52/390 |
| 9,188,348 | B2 | * | 11/2015 | Larson | ................. | F24D 13/024 |

(Continued)

FOREIGN PATENT DOCUMENTS

DE    93 06 684 U1    7/1993
EP    1 369 646 A1    12/2002
(Continued)

OTHER PUBLICATIONS

International Search Report and Written Opinion of the International Searching Authority for corresponding International Patent Application No. PCT/IB2016/054480 dated Oct. 28, 2016, 10 pages.
(Continued)

*Primary Examiner* — Brian E Glessner
*Assistant Examiner* — Daniel J Kenny
(74) *Attorney, Agent, or Firm* — Merchant & Gould P.C.

(57) ABSTRACT

A multilayer insulating panel is for the installation of an electric heating system having electric heating wires in a subfloor or in a wall of a building. The panel includes a main insulating layer including a first surface and a second opposite surface. A sheet made of polymeric material is operatively associated with one of the first or second surfaces. The sheet has a first face and a second opposite face and includes reliefs equally spaced apart on the first face to fix the electric heating wires on the first face in a reversible manner. A connection layer is fixed to the second face of the sheet. The connection layer is interposed between the second
(Continued)

face of the sheet and one of the first surface or the second surface of the main layer following the association of the main insulating layer with the polymeric sheet.

16 Claims, 2 Drawing Sheets

(51) Int. Cl.
| | | |
|---|---|---|
| *B32B 3/06* | (2006.01) | |
| *B32B 3/30* | (2006.01) | |
| *B32B 5/02* | (2006.01) | |
| *B32B 5/18* | (2006.01) | |

(52) U.S. Cl.
CPC .............. *B32B 5/18* (2013.01); *E04F 15/182* (2013.01); *F24D 13/024* (2013.01); *B32B 2262/0284* (2013.01); *B32B 2266/0278* (2013.01); *B32B 2305/345* (2013.01); *B32B 2367/00* (2013.01); *B32B 2375/00* (2013.01); *B32B 2607/00* (2013.01); *E04F 2290/023* (2013.01); *Y02B 30/00* (2013.01)

(56) References Cited

U.S. PATENT DOCUMENTS

| | | | |
|---|---|---|---|
| 9,777,931 B2 * | 10/2017 | Larson | E04F 15/182 |
| 9,890,959 B2 * | 2/2018 | Houle | E04B 5/48 |
| 2006/0201092 A1 * | 9/2006 | Saathoff | E04F 13/00 |
| | | | 52/385 |
| 2007/0039268 A1 * | 2/2007 | Ambrose, Jr. | B32B 5/02 |
| | | | 52/403.1 |
| 2017/0175389 A1 * | 6/2017 | Liang | E04B 5/48 |

FOREIGN PATENT DOCUMENTS

| | | |
|---|---|---|
| RU | 2 215 858 C2 | 11/2003 |
| RU | 2 217 664 C2 | 11/2003 |

OTHER PUBLICATIONS

Russian Search Report for corresponding Russian Patent Application No. 2018103467/03(005032) dated Nov. 4, 2019, 2 pages.
Russian Examination Request for corresponding Russian Patent Application No. 2018103467/03(005032) dated Dec. 9, 2019, 4 pages.

* cited by examiner

MULTILAYER INSULATING PANEL FOR THE INSTALLATION OF AN ELECTRIC HEATING SYSTEM IN SUBFLOORS OR WALLS

This application is a National Stage Application of PCT/IB2016/054480, filed 27 Jul. 2016, which claims benefit of Ser. No. 10/201,5000041246, filed 3 Aug. 2015 in Italy, and which applications are incorporated herein by reference. To the extent appropriate, a claim of priority is made to each of the above disclosed applications.

BACKGROUND ART OF THE INVENTION

Field of Application

The present invention generally relates to heating systems of buildings, placed in subfloors or walls. In particular, the invention relates to a multilayer insulating panel which can be used for the installation of an electric heating system including electric heating wires, in the subfloors or walls of a building.

Prior Art

Floor or wall heating systems of buildings which employ piping or electric cables placed under the floor of the building or in the wall cavities for irradiating heat into the rooms, are known and commonly used.

In particular, floor heating systems using water comprise coil piping in which heated water (or other fluids) flows, being generated by using a traditional boiler, a heat pump, a fireplace stove or by means of photovoltaic solar panels.

Floor electric heating systems generally comprise electric cables operating as electrical resistance or electric heating wires which, if crossed by electric current, heat up due to the Joule effect, thus transferring heat to the surrounding environment.

From the point of view of installing such floor heating systems, the coils of the piping in which the heated fluid flows or the heating wires are laid under the floor on panels manufactured from thermally insulating material and placed on the slab of the dwelling. Such insulating panels improve the efficiency of the floor heating system because:
- they reduce the propagation of heat towards the slab;
- they limit the thermal inertia of the system;
- they provide the floor heating system with a mechanical resistance.

Certain insulating panels of known type which can be used for these purposes particularly comprise a sheet made of foam polystyrene having opposite flat surfaces and configured to create a separating insulating structure between the slab and the screed in which the coils or the heating wires are laid.

According to a first example, the polystyrene sheet of such panels needs to be covered by a net provided with specific fasteners for anchoring the coil piping.

In a second example, a sheet made of polymeric material provided with a plurality of projections or bosses is fixed, e.g. glued, to one of the surfaces of the insulating polystyrene sheet. In particular, the bosses of such a sheet are configured to promote the reversible fixing of the electric heating wires on the sheet itself, and therefore the fixing of the heating wires to the panel.

The insulating polystyrene panels of known type which can be used in floor or wall heating systems, in particular those comprising an embossed sheet, have certain drawbacks.

Indeed, the embossed sheet which is glued to the polystyrene sheet of the panel comprises bosses on a first face and recesses on a second opposite face of the sheet: each recess is obtained at a respective boss. Thereby, such a second face of the sheet, which is glued to the polystyrene sheet, provides a small surface for the sheet itself to adhere to the aforesaid sheet. Thereby, the gluing of the embossed sheet to the polystyrene sheet of the panel is not very effective. The insulating panel as a whole may suffer from involuntary detachments of the embossed sheet, especially if the insulating panel is laid in the cavities of a wall for providing a wall heating system, that is on a plane orthogonal to the plane of the slab.

According to another process for producing the panel, the embossed sheet is molded together with the polystyrene sheet, thus generating a preformed panel. The thermoforming process employed is a batch process, which is generally complex and slower in terms of processing times as compared to other industrial manufacturing processes.

SUMMARY OF THE INVENTION

It is the object of the present invention to devise and provide a multilayer insulating panel for the installation of an electric heating system in subfloors or walls of a building, which allows to at least partially obviate the drawbacks noted above in reference to known insulating panels used for the same purposes.

In particular, it is an object of the invention to provide a multilayer insulating panel including an embossed sheet in which such an embossed sheet adheres to the insulating layer more effectively.

It is another object of the invention to provide a multilayer insulating panel which may be manufactured using alternative, less costly manufacturing methods and employing other insulating materials than polystyrene, with superior heat insulating properties and smaller thicknesses.

Such objects are achieved by means of a multilayer insulating panel according to claim 1.

Preferred embodiments of such a multilayer insulating panel are described in the dependent claims 2-10.

The present invention also relates to a method for manufacturing a multilayer insulating panel for the installation of an electric heating system in a subfloor or in a wall of a building according to claim 11.

BRIEF DESCRIPTION OF THE DRAWINGS

Further features and advantages of the multilayer insulating panel for the installation of an electric heating system in subfloors or walls according to the invention will become apparent from the following description of preferred embodiments thereof, given only by way of non-limiting, indicative example, with reference to the accompanying drawings, in which.

DETAILED DESCRIPTION OF PREFERRED EMBODIMENTS

Figure 1:
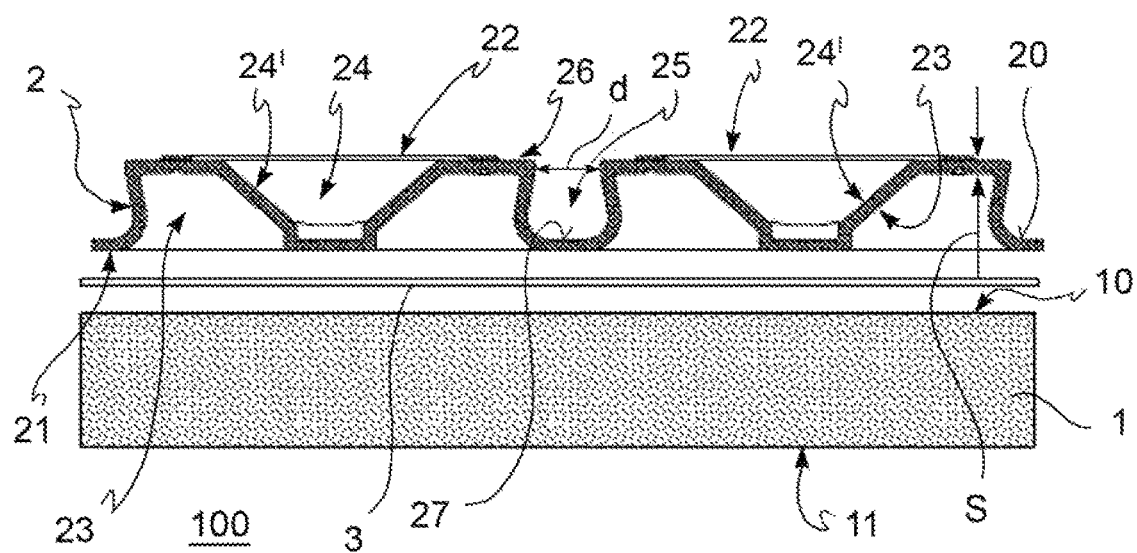
FIG. 1 shows an enlarged, exploded longitudinal sectional view of an embodiment of a multilayer insulating panel of the invention.
Figure 3:
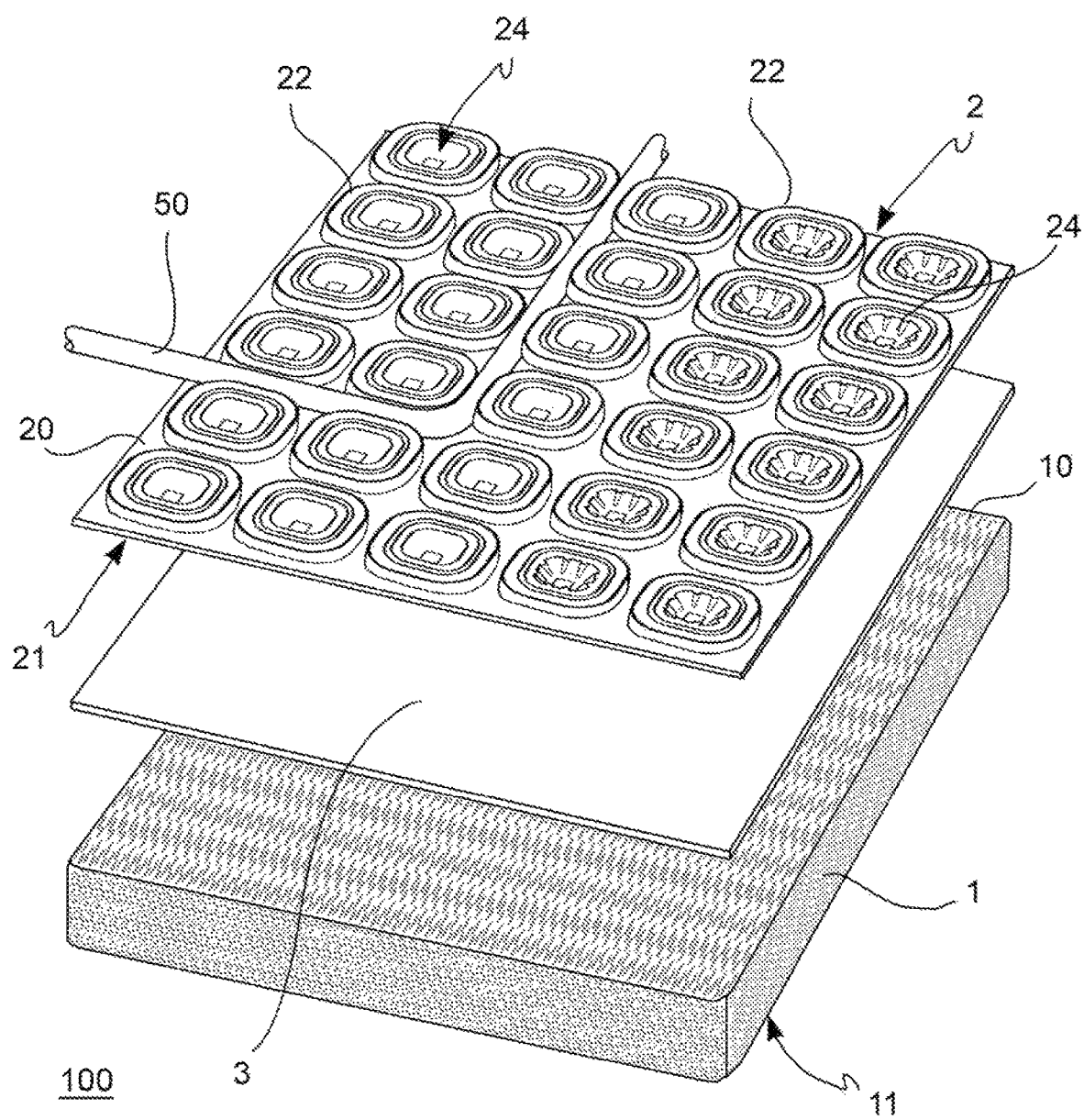
FIG. 3 shows an exploded perspective view of the multilayer insulating panel of the invention. Identical or similar elements will be indicated by the same numerals in the aforesaid FIGS. 1-3.

Referring to the aforesaid FIGS. 1 and 3, a multilayer insulating panel according to the invention for the installation of an electric heating system comprising electric heating wires 50 in subfloors or walls of a building is indicated as a whole with numeral 100.

In a floor heating system, such insulating panels 100 are placed on the slab of the room or living space of the building to be heated, thus being under the screed (or the glue) on which the tiles or other coverings of the usable floor are fixed. In a wall heating system, such insulating panels 100 are housed in cavities obtained in the walls, that is they are positioned on planes orthogonal to the plane of the slab in dry applications, associated for example with panels made of materials such as plasterboard or calcium silicate.

Hereinafter, the term insulating panel means a panel configured to insulate the living space thermally from the surrounding environments, in particular preventing the heat diffusion toward the slab (in the case of a floor heating system) or toward adjacent living spaces or the external environment (in the case of a wall heating system).

Moreover, later in the description, the multilayer insulating panel 100 is also referred to as an insulating panel or simply a panel.

The multilayer insulating panel 100 comprises a main layer 1 manufactured from a thermally insulating material. Such a main layer 1 comprises a first surface 10 and a second surface 11, which are opposite to each other.

In a preferred embodiment, such a main layer 1 of panel 100 comprises polyurethane foam (PUR-PIR).

The insulating panel 100 further comprises a sheet 2 made of polymeric material operatively associated with one of the aforesaid first 10 or second 11 surface of the main layer 1.

In particular, such a sheet 2 has a first face 20 and a second opposite face 21 operatively associated with the main insulating layer 1.

The first face 20 of the sheet comprises a plurality of reliefs or bosses 22 equally spaced apart on the aforesaid first face 20. In the example in FIGS. 1 and 3, sheet 2 comprises such reliefs 22, or bosses, which project from the first face 20 of the sheet 2 itself in a direction away from the main insulating layer 1.

Referring to the sectional view of panel 100 in FIG. 1, sheet 2 comprises a plurality of recesses 23 on the second face 21. Each recess 23 of the second face 21 is placed at a respective relief 22 of the first face 20 of sheet 2.

Figure 2:
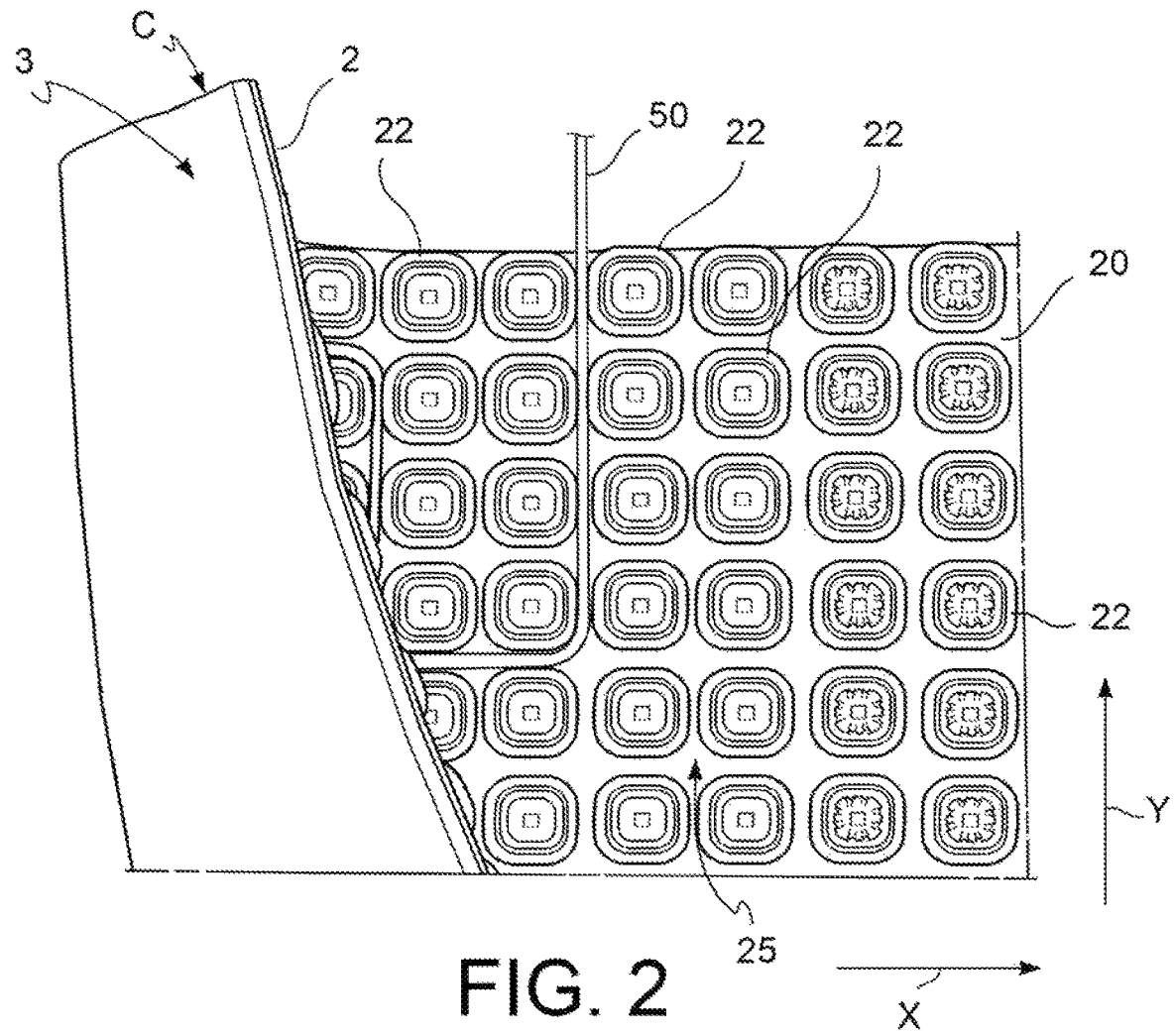
FIG. 2 shows a partially overturned, top view of a sheet made of polymeric material provided with bosses, coupled to a connection layer which is then coupled to an insulating layer in the panel in FIG. 1.

In particular, each boss 22 has a section with a plane parallel to the sheet 2 itself, which is substantially square in shape with rounded corners. Such a section of the bosses 22 may also be of various shapes. Moreover, referring to FIGS. 2 and 3, each boss comprises a blind recess 24 delimited by inclined side walls 24' which degrade from a first top portion of boss 22 toward a bottom of the boss itself. As shown in FIGS. 2 and 3, various shapes can be associated with the aforesaid inclined walls 24' of boss 22.

Referring to FIG. 2, the bosses 22 of the first face 20 of sheet 2 are aligned along a first direction X indicated by a respective arrow, to form a plurality of substantially parallel rows along such a first direction X. Similarly, such bosses 22 are aligned along a second direction Y orthogonal to the first direction X indicated by a respective arrow, to form a plurality of substantially parallel columns. Such rows and columns along the first X and second Y directions, respectively, form an array structure of bosses 22.

Each row/column of bosses 22 is separated from an adjacent row/column by a compartment 25 configured to house an electric heating wire 50.

In particular, the bosses 22 of sheet 2 are configured to fix the aforesaid electric heating wires 50 on the first face 20 of sheet 2 in a reversible manner.

Indeed, referring to FIG. 1, an outer side surface of boss 22 comprises a top portion 26 which protrudes with respect to a bottom portion 27. A distance d between protruding top portions of bosses of adjacent rows/columns is from about 1 mm to 8 mm, in relation to the diameter of the heating wire 50. Such a distance d is less than an average diameter of heating wire 50 which can be used in the floor or wall heating system. Thereby, such a heating wire 50 may be inserted into compartment 25 between the bosses 22 and fixed, e.g. snappingly fixed, to the embossed sheet 2. Advantageously, such a fixing is of the reversible type. It is worth noting that a further distance between the top portion of the bosses 22 and the bottom of compartment 25 is greater than or equal to the average diameter of the heating wire 50.

The above-mentioned sheet 2 made of polymeric material of panel 100 has a thickness S from 50 μm to 2 mm.

The polymeric material with which the embossed sheet 2 is manufactured is selected from the group consisting of:
high density polyethylene or HDPE;
low density polyethylene or LDPE;
polypropylene (PP);
polystyrene (PS);
polyvinyl chloride (PVC);
polyethylene terephthalate (PET);
mixtures of polymers.

Such a polymeric material may possibly include additives which give sheet 2 properties of elasticity, mechanical resistance, fire resistance.

It is worth noting that the above-mentioned polymeric materials may be virgin, that is of first use, or recycled.

Advantageously, the insulating panel 100 of the invention further comprises a connection layer 3 fixed to the second face 21 of the polymeric sheet 2. In particular, following the association of the main insulating layer 1 with the polymeric sheet 2, such a connection layer 3 is interposed between the second face 21 of the polymeric sheet 2 and one of the first 10 or the second 11 surface of the main insulating layer 1. In the example in FIGS. 1 and 3, the connection layer 3 is interposed between the second face 21 of the polymeric sheet 2 and the first surface 10 of the main insulating layer 1 of panel 100.

Referring to FIGS. 1 and 2, it is worth noting that such a connection layer 3 is a layer without interruptions and once it is fixed to the second face 21 of the polymeric sheet 2, it is configured to close the recesses 23 of the second face 21 completely, that is to make such recesses 23 inaccessible and prevent them from directly contacting the first surface 10 of the main insulating layer 1 of panel 100.

In a first advantageous embodiment of the invention, such a connection layer 3 is a layer made of fibrous material.

In particular, such a fibrous connection layer 3 of the insulating panel 100 is manufactured from a material selected from the group consisting of:
a synthetic fabric or a synthetic non-woven fabric, such as for example polypropylene (PP), polyethylene terephthalate (PET), polyethylene (PE);
glass fiber;
a synthetic composite fabric or a synthetic composite non-woven fabric;
a natural fabric or a natural non-woven fabric;
a net;

paper;
a fabric or non-woven fabric consisting of a combination of the above-mentioned elements.

In a second embodiment of the invention, such a connection layer 3 is a film.

In this case, such a connection layer 3 of the insulating panel 100 is manufactured from a material selected from the group consisting of: synthetic polymeric film, such as for example polypropylene (PP), polyethylene terephthalate (PET), polyethylene (PE), polyamide (PA), ethylene vinyl alcohol (EVOH), polyurethane (PU) and combinations thereof;

metal sheets or metallized plastic films;
multilayer film with combinations of various films and combinations of films and fibrous layers.

In one embodiment, such a connection layer 3 has a weight per unit area from 20 $g/m^2$ to 200 $g/m^2$.

Referring to FIG. 2, it is also worth noting that the overall layer C of the panel, which includes the connection layer 3 fixed to the polymeric sheet 2, with the thicknesses indicated above, is a flexible layer, that is such an overall layer C may be folded over and rolled up.

An example of the method for manufacturing the multilayer insulating panel 100 of the invention is described below.

In particular, the polymeric sheet 2 including the bosses 22 is preformed by means of extrusion and forming, that is by means of known techniques.

At the same time, the connection layer 3 is applied to the second face 21 of sheet 2 when exiting from the forming step to form the overall layer C. In a first example, such a connection layer 3 may be applied to such a second face 21 of sheet 2 directly when extruding and forming the hot polymer which forms sheet 2. In a different example, such a connection layer 3 may be applied to sheet 2 already formed, e.g. by gluing.

In order to manufacture the insulating panel 100, the method of the invention comprises, in a preferred embodiment, a step of applying the preformed overall layer C to the main polyurethane layer 1 substantially simultaneously with the expansion of the polyurethane foam itself, which occurs by means of a continuous process.

In particular, the connection layer 3 associated with the embossed sheet 2 is a planar support layer configured to contain the expansion of the polyurethane foam when manufacturing the polyurethane panel 100. If such a connection layer 3 is not present, the expanding polyurethane foam would not be capable of flowing in the continuous production process due to the recesses 23 on the second face 21 of sheet 2.

Moreover, such a connection layer 3 acts as a promoter of adhesion between the overall layer C, including the embossed sheet 2, and the main insulating layer 1 of panel 100.

As may be noted, the object of the present invention is completely achieved by the multilayer insulating panel 100, in the light of its functional and structural features disclosed above.

In particular, in the multilayer insulating panel 100 of the invention which comprises the connection layer 3, the embossed sheet 2 adheres to the main insulating layer 1 more effectively, whether or not the latter is made of polyurethane or of another insulating material. Indeed, the surface of adhesion to the insulation provided by the connection layer 3 is larger than the surface of adhesion which the second face 21 of the embossed sheet 2 would provide in the absence of such a layer.

Moreover, in the case of a main insulating layer 1 of panel 100 comprising polyurethane, the aforesaid process for manufacturing panel 100 is particularly advantageous because it allows the panel itself to be manufactured with a continuous method. This avoids a step of gluing the overall layer C to the insulating sheet following the formation of the insulating sheet, which is instead required when using insulating materials other than polyurethane. Such a continuous manufacturing method thus ensures shorter manufacturing times and less complexity as compared to a batch method.

However, it is worth noting that the insulating panel 100 of the present invention could also be manufactured in accordance with a traditional manufacturing process, that is by gluing the overall layer C, comprising the embossed sheet 2 and the connection layer 3, to a preformed polyurethane sheet.

Moreover, the Applicant has verified that panel 100 of the invention has a higher compression resistance than that associated with known panels employing polystyrene.

Moreover, by using polyurethane, which has higher insulating properties than those of polystyrene, the main insulating layer 1 of panel 100 may be made so as to have a smaller thickness than the thicknesses of the insulating layers of known panels, in order to obtain the same insulation. Thereby, the overall thickness of panel 100 is small as compared to that of known panels, with significant advantages in terms of storing and warehousing the panels, as well as in terms of overall thicknesses of the stratigraphies of slabs and walls.

In a particular embodiment of panel 100 for wall application, such a panel 100 may be used in association with a plasterboard sheet (not shown in the figures), or with other inert panels, the sheet being configured to cover the bosses 22 of the embossed sheet 2 once the heating wires 50 have been fixed.

A surface of such a plasterboard sheet opposite to the surface adjacent to the bosses 22 may advantageously comprise a molded graphic pattern which replicates the pitch of the bosses 22 themselves.

Such a graphic pattern is adapted to provide a reference on the arrangement and distance between the bosses 22 of panel 100, and accordingly a reference on the placement of the heating wires 50. If activities are to be performed on the heating wall, which require drilling holes in the wall itself, such a graphic pattern advantageously allows to carry out such holes without damaging the heating wires 50 of the heating system.

In particular, it is worth noting that the aforesaid graphic pattern molded on the surface of the plasterboard sheet remains visible in the area below the baseboard, even after the walls have been painted.

Alternatively, the plasterboard (or other material) may be interrupted before reaching the floor, thus leaving an embossed sheet portion uncovered under the baseboard.

Those skilled in the art may make several changes and adaptations to the embodiments of an above-described multilayer insulating panel, and may replace elements with others which are functionally equivalent in order to meet contingent needs, without departing from the scope of the following claims. All the features described above as belonging to a possible embodiment may be implemented irrespective of the other embodiments described.

The invention claimed is:
1. A multilayer insulating panel for installation of an electric heating system in a subfloor or in a wall of a building, said electric heating system comprising electric heating wires, the panel comprising:
- a main layer comprising a thermally insulating material including a first surface and a second opposite surface, wherein the thermally insulating material comprises polyurethane foam;
- a sheet made of polymeric material operatively associated with one of said first surface or said second surface of the main layer of polyurethane foam, said sheet having a first face and a second opposite face, said sheet comprising a plurality of bosses equally spaced apart on said first face and configured to removably fix the electric heating wires on the first face of the sheet;
- a connection layer fixed to the second face of said polymeric sheet, said connection layer being interposed between the second face of the polymeric sheet and one of the first surface or the second surface of the main layer of polyurethane foam;
- wherein said connection layer has a weight per unit area from 20 g/m$^2$ to 200 g/m$^2$;
- wherein said sheet of polymeric material has a thickness from 50 μm to 2 mm;
- wherein a section parallel to the connection layer through each of the bosses is substantially square with rounded corners.

2. A multilayer insulating panel according to claim 1, wherein said connection layer is a layer made of fibrous material.

3. A multilayer insulating panel according to claim 1, wherein said connection layer is a film.

4. A multilayer insulating panel according to claim 2, wherein said fibrous layer is a material selected from the group consisting of:
- a synthetic fabric or a synthetic non-woven fabric, including polypropylene (PP), polyethylene terephthalate (PET), polyethylene (PE);
- glass fiber;
- a synthetic composite fabric or a synthetic composite non-woven fabric;
- a natural fabric or a natural non-woven fabric;
- a net; and
- paper.

5. A multilayer insulating panel according to claim 3, wherein said film of the connection layer is a material selected from the group consisting of:
- synthetic polymeric film including polypropylene (PP), polyethylene terephthalate (PET), polyethylene (PE), polyamide (PA), ethylene vinyl alcohol (EVOH), polyurethane (PU) and combinations thereof;
- metal sheets or metallized plastic films;
- multilayer film with combinations of different films and combinations of films and fibrous layers.

6. A multilayer insulating panel according to claim 1, wherein the polymeric material of the sheet is selected from the group consisting of:
- high density polyethylene or HDPE;
- low density polyethylene or LDPE;
- polypropylene (PP);
- polystyrene (PS);
- polyvinyl chloride (PVC);
- polyethylene terephthalate (PET).

7. A multilayer insulating panel according to claim 1, wherein said sheet comprises a plurality of recesses on the second face, each recess being placed at a respective boss of the first face of the sheet, and wherein said connection layer fixed to the second face of the polymeric sheet is a layer free of interruptions configured to close said recesses completely.

8. A multilayer insulating panel according to claim 1, wherein the protruding top portions are configured to accept a wire having a diameter, wherein a distance between the protruding top portions of adjacent bosses is less the diameter of the wire.

9. A multilayer insulating panel according to claim 8, wherein a distance between a top of the bosses and a bottom of a compartment formed between adjacent bosses is greater than or equal to the diameter of the wire.

10. A multilayer insulating panel according to claim 1, wherein each of the bosses comprises a continuous outer wall.

11. A multilayer insulating panel according to claim 10, wherein the continuous outer wall has straight sides and rounded corners.

12. A multilayer insulating panel according to claim 11, wherein each of the bosses defines a blind recess comprising four inclined inner sidewalls on the first face of said continuous sheet.

13. An electric heating system housed in a subfloor or in a wall of a building, comprising:
- a multilayer insulating panel in the electric heating system in the subfloor or in the wall of a building, the panel comprising:
- a main layer comprising a thermally insulating material including a first surface and a second opposite surface, wherein the thermally insulating material comprises polyurethane foam;
- a sheet made of polymeric material operatively associated with one of said first surface or said second surface of the main layer of polyurethane foam, said sheet having a first face and a second opposite face, said sheet comprising a plurality of bosses equally spaced apart on said first face;
- a connection layer fixed to the second face of said polymeric sheet, said connection layer being interposed between the second face of the polymeric sheet and one of the first surface or the second surface of the main layer of polyurethane foam;
- a plurality of electric heating wires removably fixable to said panel, the wires having a diameter;
- wherein a compartment is defined between adjacent bosses configured to removably fix the electric heating wires on the first face of the sheet, the bosses comprising protruding top portions at an upper portion of the compartment;
- wherein a distance between adjacent protruding portions is less than the diameter of the wires,
- wherein a distance between a top of the bosses and a bottom of the compartment is greater than or equal to the diameter of the wires; and
- wherein a section parallel to the connection layer through each of the bosses is substantially square with rounded corners.

14. The electric heating system according to claim 13, wherein each of the bosses comprises a continuous outer wall.

15. The electric heating system according to claim 14, wherein the continuous outer wall has straight sides and rounded corners.

16. The electric heating system according to claim 15, wherein each of the bosses defines a blind recess comprising four inclined inner sidewalls on the first face of said continuous sheet.

* * * * *